United States Patent
Tapse

(10) Patent No.: US 11,523,175 B2
(45) Date of Patent: Dec. 6, 2022

(54) METHODS AND APPARATUS TO VALIDATE REFERENCE MEDIA ASSETS IN MEDIA IDENTIFICATION SYSTEM

(71) Applicant: The Nielsen Company (US), LLC, New York, NY (US)

(72) Inventor: Sandeep Tapse, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/217,798

(22) Filed: Mar. 30, 2021

(65) Prior Publication Data
US 2022/0321953 A1    Oct. 6, 2022

(51) Int. Cl.
*H04H 60/32* (2008.01)
*H04N 21/442* (2011.01)
*H04N 21/44* (2011.01)

(52) U.S. Cl.
CPC . *H04N 21/44204* (2013.01); *H04N 21/44008* (2013.01)

(58) Field of Classification Search
CPC ......... H04N 21/44222; H04N 21/2668; H04N 21/4668
USPC .......................................... 725/19, 105, 118
See application file for complete search history.

(56) References Cited

U.S. PATENT DOCUMENTS

| | | | |
|---|---|---|---|
| 4,677,466 A | 6/1987 | Lert, Jr. et al. | |
| 5,481,294 A | 1/1996 | Thomas et al. | |
| 7,460,684 B2 | 12/2008 | Srinivasan | |
| 9,438,940 B2 | 9/2016 | Nelson | |
| 9,548,830 B2 | 1/2017 | Kariyappa et al. | |
| 9,668,020 B2 | 5/2017 | Nelson et al. | |
| 10,200,546 B2 | 2/2019 | Nelson et al. | |
| 2005/0232411 A1 | 10/2005 | Srinivasan et al. | |
| 2006/0153296 A1 | 7/2006 | Deng | |
| 2006/0184961 A1 | 8/2006 | Lee et al. | |
| 2006/0195861 A1 | 8/2006 | Lee | |
| 2007/0274537 A1 | 11/2007 | Srinivasan | |
| 2008/0091288 A1 | 4/2008 | Srinivasan | |
| 2008/0276265 A1 | 11/2008 | Topchy et al. | |
| 2013/0263207 A1* | 10/2013 | Granstrom | H04L 65/60 726/1 |

* cited by examiner

*Primary Examiner* — Jivka A Rabovianski
(74) *Attorney, Agent, or Firm* — Hanley, Flight & Zimmerman, LLC

(57) ABSTRACT

Methods, apparatus, systems and articles of manufacture are disclosed to validate reference media assets in media identification systems. Example apparatus disclosed herein include an asset data receiver to identify respective instances of media represented by corresponding candidate media resources to be verified, and a media player controller to cause the respective instances of media to be presented and monitored by corresponding ones of a plurality of virtual machines. Disclosed example apparatus also include an asset matcher to perform a comparison of a first one of the candidate media resources to a corresponding test media resource generated by a first one of the virtual machines that played and monitored a first one of the instances of media represented by the first one of the candidate media resources. Disclosed example apparatus further include an asset validator to validate the first one of the candidate media resources based on the comparison.

18 Claims, 5 Drawing Sheets

METHODS AND APPARATUS TO VALIDATE REFERENCE MEDIA ASSETS IN MEDIA IDENTIFICATION SYSTEM

FIELD OF THE DISCLOSURE

This disclosure relates generally to media identification systems, and, more particularly, to methods and apparatus to validate reference media assets in media identification systems.

BACKGROUND

A media monitoring entity can generate signatures (also referred to as media signatures, which can be audio signatures, video signatures, etc.) from a media signal (e.g., an audio signal, a video signal, etc.). Signatures are a condensed reference that can be used to subsequently identify the media. In some examples, a media monitoring entity can monitor a media source feed (e.g., a television feed, etc.) to generate reference signatures representative of media presented via that media source feed. Such reference signatures can be compared to signatures generated by media monitors to credit viewership of the media.

BRIEF DESCRIPTION OF THE DRAWINGS

The figures are not to scale. In general, the same reference numbers will be used throughout the drawing(s) and accompanying written description to refer to the same or like parts.

Figure 1:
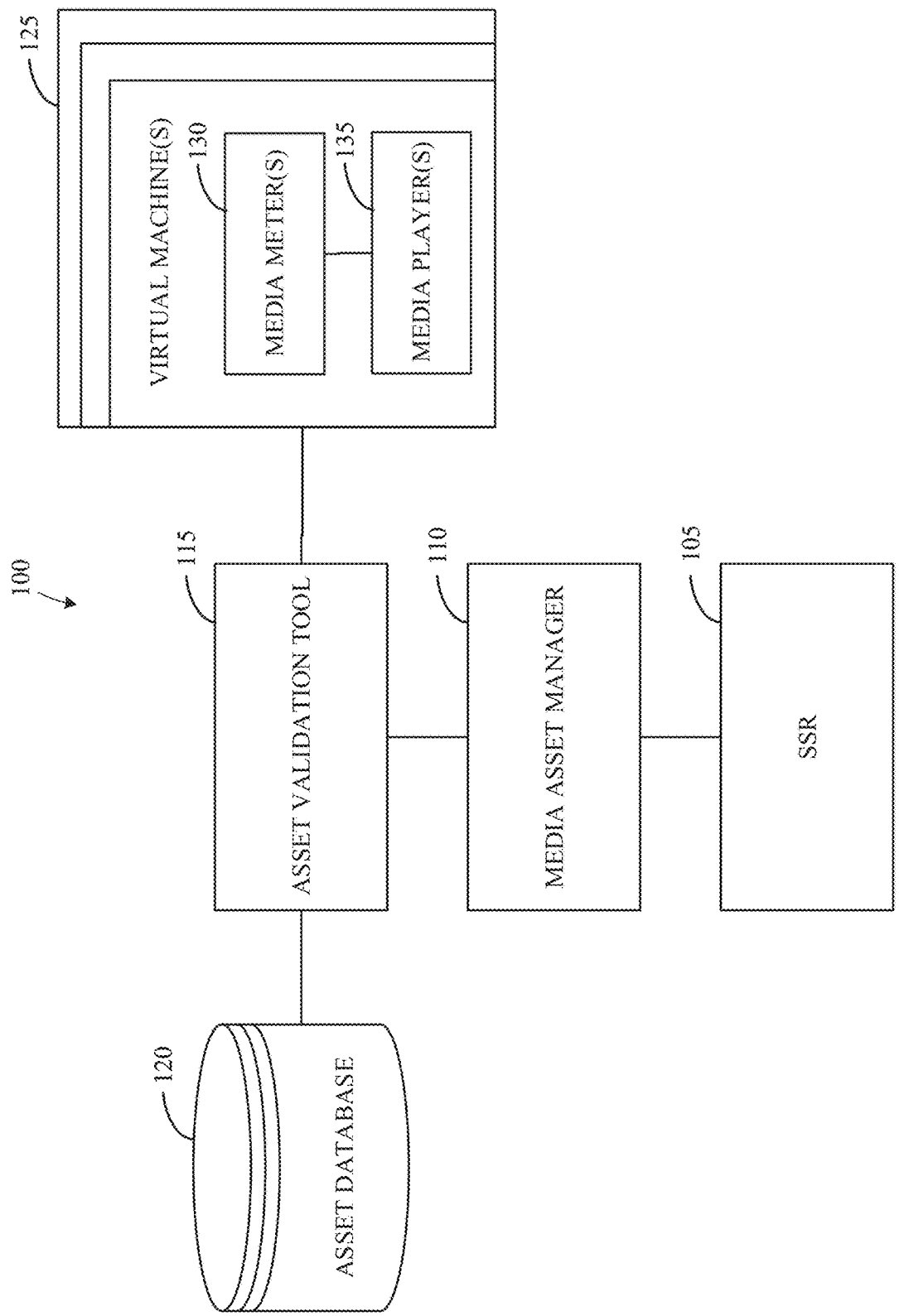
FIG. 1 is a block diagram of an example environment in which the teachings of this disclosure may be implemented.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time +/−1 second.

DETAILED DESCRIPTION

As used herein, the term "media" includes any type of content and/or advertisement delivered via any type of distribution medium. Thus, media includes television programming or advertisements, radio programming or advertisements, movies, web sites, streaming media, etc. As used herein, the term "media asset" refers to any individual, collection, or portion/piece of media of interest. For example, a media asset may be a television show episode, a movie, a clip, a commercial, etc. Media assets can be identified via unique media identifiers (e.g., a name of the media asset, a metadata tag, etc.). Media assets can be presented by any type of media presentation method (e.g., via streaming, via live broadcast, from a physical medium, etc.).

Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

In some examples, media monitoring information is aggregated to determine ownership and/or usage statistics of media devices, determine the media presented by the media devices, determine audience ratings, determine relative rankings of usage and/or ownership of media devices, determine types of uses of media devices (e.g., whether a device is used for browsing the Internet, streaming media from the Internet, etc.), determine other types of media device information, etc. In examples disclosed herein, monitoring information includes, but is not limited to, one or more of media identifying information (e.g., media-identifying metadata, codes, signatures, watermarks, and/or other information that may be used to identify presented media), application usage information (e.g., an identifier of an application, a time and/or duration of use of the application, a rating of the application, etc.), user-identifying information (e.g., demographic information, a user identifier, a panelist identifier, a username, etc.), etc.

Media monitoring entities, such as The Nielsen Company (US), LLC, desire knowledge regarding how users interact with media devices such as smartphones, tablets, laptops, smart televisions, etc. For example, media monitoring entities may monitor media presentations made at the media devices to, among other things, monitor exposure to advertisements, determine advertisement effectiveness, determine user behavior, identify purchasing behavior associated with various demographics, etc. Media monitoring entities can provide media meters to people (e.g., panelists) which can generate media monitoring data based on the media exposure of those users. Such media meters can be associated with a specific media device (e.g., a television, a mobile phone, a computer, etc.) and/or a specific person (e.g., a portable meter, etc.).

In some examples, media monitoring entities utilize signature matching to identify media. Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the terms "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing those monitored signature(s) to one or more references signatures corresponding to known (e.g., reference) media source feeds. Various comparison criteria, such as a cross-correlation value, a Hamming distance, etc., can be evaluated to determine whether a monitored signature matches a particular reference signature. When a match between the monitored signature and a reference signature is found, the monitored media can be identified as corresponding to the particular reference media represented by the reference signature that matched with the monitored signature. In some examples, signature matching is based on sequences of signatures such that, when a match between a sequence of monitored signatures and a sequence of reference signatures is found, the monitored media can be identified as corresponding to the particular reference media represented by the sequence of reference signatures that matched the sequence of monitored signatures. Because attributes, such as an identifier of the media, a presentation time, a broadcast channel, etc., are collected for the reference signature(s), these attributes may then be associated with the monitored media whose monitored signature matched the reference signature(s). Example systems for identifying media based on codes and/or signatures are long known and were first disclosed in Thomas, U.S. Pat. No. 5,481,294, which is hereby incorporated by reference in its entirety.

Media monitoring entities can generate media reference databases that can include unhashed signatures, hashed signatures, and watermarks. These references are generated by a media monitoring entity (e.g., at a media monitoring station (MMS), etc.) by monitoring a media source feed, identifying any encoded watermarks and/or determining signatures associated with the media source feed. In some examples, the media monitoring entity can hash the determined signatures. A media monitoring entity may additionally and/or alternatively generate reference signatures for downloaded reference media, reference media transmitted to the media monitoring entity from one or more media providers, etc. In some examples, media monitoring entities store generated reference databases and gathered monitoring data on cloud storage services (e.g., Amazon Web Services™, etc.).

The reference database can be compared (e.g., matched, etc.) to media monitoring data (e.g., watermarks, unhashed signatures, hashed signatures, etc.) gathered by media meter(s) to allow crediting of media exposure. Monitored media can be credited using one, or a combination, of watermarks, unhashed signatures and hashed signatures. Example solutions disclosed herein help achieve accurate crediting by verifying the reference media used to generate the reference signatures and references watermarks for inclusion in the reference database (s) accurately the media assets to be credited. For example, a client (e.g., a service provider and/or media provider) may provide the media monitoring entity with a reference media asset that includes a program name marked as "S1E1" for a TV series titled "ABC," which is to be used to generate reference signatures/ watermarks to compare with media monitoring data during the crediting process of exposure to that program. However, the version of the media asset that is monitored for media exposure may differ from the version of the reference media asset provided by the client (e.g., the monitored version of the media asset may have been edited, such as, by speeding up the media to include time for advertisements, etc.). In such examples, the media monitoring entity may not correctly credit the real world exposure to the media asset because the generated reference signatures based on the reference media asset provided by the client may not match the monitored signatures generated from monitoring the real world exposure to the media.

Methods and apparatus disclosed herein enable the validation of reference media assets. For example, a media monitoring entity may generate reference signatures for a media asset provided by a client, query the reference database to check if there are any duplicate reference media assets, and add the generated reference signatures as a new reference media asset to the reference database if there are not duplicates. Examples disclosed herein include a validation tool to check the generated reference signatures against signatures generated from monitoring a simulated presentation of the media asset to verify the generated reference signatures accurately represent a real world presentation of the media asset. Examples disclosed herein may use virtual machines executing media meter technology to present and monitor media assets in parallel from different service providers (e.g., Netflix, Hulu, TV Channel Provider, etc.) to collect media monitoring data for validating the reference media assets. In examples disclosed herein, monitored signatures generated by the virtual/simulated presentation of the media asset on the virtual machines are compared to the reference signatures stored in the reference database to verify that the reference signatures match the signatures generated during an actual presentation of the media (e.g., simulated on the virtual machine). In examples disclosed herein, a percent match rate between the reference signatures and the signatures from the virtual machine(s) is used to determine whether the reference media asset associated with the reference signatures can be validated, and if not, whether the reference media asset can be corrected based on the monitored signatures from the virtual machine or should be removed from the reference database.

FIG. 1 is a block diagram of an example environment 100 in which the teachings of this disclosure may be implemented. The example environment 100 includes an example Streaming Video on Demand Content Ratings (SSR) 105, an example media asset manager 110, an example asset validation tool 115, an example asset database 120, example virtual machine(s) 125. The example virtual machine(s) 125 further execute example applications to implement respective example media meter(s) 130 and example media player(s) 135.

The example SSR 105 obtains reference media assets for media crediting. In some examples, the SSR 105 monitors a media source feed to identify any encoded watermarks and determining signatures associated with the media source feed. In such examples, the example SSR 105 uses the identified watermarks and/or signatures to create a reference media resource that includes the identified watermarks and/or signatures, which allows for the media source feed to be credited to the reference media asset during the next exposure to the identified watermarks and/or signatures. As used herein, a media resource refers to the watermarks and/or signatures that are associated with a media asset (e.g., the watermarks and/or signatures generated and/or obtained from the presentation of a media asset such as, an episode of a television program, a song, a commercial advertisement, etc.). In some examples, the SSR 105 generates reference signatures and/or reference watermarks from downloaded reference media, reference media transmitted to the media monitoring entities from one or more media providers, etc. In such examples, the SSR 105 receives reference media (e.g., downloaded, from a client/media provides, etc.) and generates reference signatures and/or reference watermarks to create a reference media resource that includes the generated reference signatures and/or reference watermarks.

The example media asset manager 110 receives the reference media resources associated with the reference media assets from the SSR 105. The example media asset manager 110 compares the new reference media assets from the SSR 105 to the collection of reference media assets included in the example asset database 120 to check for duplicate reference media assets. In examples disclosed herein, the collection of reference media assets included in the asset database 120 may include the corresponding reference media resources (the generated reference signatures and/or reference watermarks), identification information identifying the respective media assets (e.g., the name of an episode of a TV show, the name of a song, etc.), media provider information (e.g., Netflix, Hulu, ABC, etc.), etc. In some examples, the collection of reference media assets may be a list, a table, or any other suitable data structure to store the information associated with the reference media assets. If the example media asset manager 110 determines that there are no duplicate reference media assets between the new reference media assets from the SSR 105 and the collection of reference media assets included in the example asset database 120, the example media asset manager 110 uploads the new reference media assets and the associated reference media resources to the collection of reference media assets included in the example asset database 120.

In the illustrated example of FIG. 1, the example asset validation tool 115 obtains the collection of reference media assets from the example asset database 120 including the new reference media assets uploaded by the example media asset manager 110. In some examples, the asset validation tool 115 obtains the collection of media provider information (e.g., Netflix, Hulu, etc.) associated with each of the reference media assets. The example asset validation tool 115 launches the example virtual machine(s) 125 to execute applications to virtually present (or play back) a selected reference media asset (e.g., via an application to implement the example media player 135) and virtually monitor the resulting presentation (e.g., via an application to implement the example media meter 130). In some examples, the asset validation tool 115 selects each of the reference media assets from the collection of reference media assets from the example asset database 120 to be virtually presented and monitored on the launched virtual machine(s) 125. In some examples, the asset validation tool 115 may only select the new reference media assets added to the collection of reference media assets by the example media asset manager 110. In some examples, the asset validation tool 115 may select reference media assets from the collection of reference media assets that have not been validated recently by the asset validation tool 115. For example, the asset validation tool 115 may record when reference media assets have been validated, and the asset validation tool 115 may select reference media assets that do not meet a threshold period of time since the last validation (e.g., one week since last validation, one month since last validation, one year since last validation, etc.).

The example asset validation tool 115 determines where a user-accessible and commercially available version of the media identified in the selected reference media asset(s) can be accessed and presented based on the associated identification information (e.g., the name of an episode of a TV show, the name of a song, etc.) and the associated media provider information (e.g., Netflix, Hulu, ABC, etc.) included in the collection of reference media assets. The example asset validation tool 115 launches the virtual machine(s) 125 to execute an application to implement the example media player 135 to virtually present (or play back) the user-accessible and commercially available version of the media (e.g., the video of an episode of a TV show on Hulu, a movie on Netflix, a song on Spotify, etc.) and to execute an application to implement the example media meter 130 to virtually monitor the resulting presentation of the user-accessible and commercially available version of the media.

The example asset validation tool 115 receives media monitoring data from the example media meter(s) 130 to determine media monitoring signatures. The example asset validation tool 115 compares the media monitoring signatures to the reference signatures of the reference media resources included in the collection of reference media assets to verify that the video presented and monitored on the example virtual machines(s) 125 matches the expected reference media resource in the collection of reference media assets of the example asset database 120. The example asset validation tool determines a percent match rate between the media monitoring signatures and the reference signatures to determine if the associated reference media resource should be kept, edited, or removed from the asset database 120. An example implementation of the asset validation tool 115 is described in further detail below in connection with FIG. 2.

The example asset database 120 includes reference signatures that were created or otherwise obtained by the example SSR 105 and uploaded by the example media asset manager 110. In some examples, a reference signature is stored as a reference media resource in the asset database 120 and is associated with a reference signature stream representative of a particular reference media asset, such as, but not limited to, an episode of a television series, a movie, an advertisement, etc. In some examples, the asset database 120 can include a library (e.g., database, table, etc.) of reference signature streams stored as reference media resources.

The example virtual machine(s) 125 include the example media player(s) 135 to virtually present (play back) media identified by the example asset validation tool 115 and the example media meter(s) 130 to monitor the virtual presentations of the media on the example media player(s) 135. In examples disclosed herein, the example environment 100 of FIG. 1 may include a single virtual machine 125. In some examples, the example environment 100 may include a plurality of virtual machine(s) 125 (e.g., one virtual machine per reference media asset selected by the example asset validation tool 115). For example, if the asset validation tool 115 selects or otherwise identifies 100 reference media assets to validate, the asset validation tool 115 may launch 100 virtual machines 125. In some examples, each of the example virtual machine(s) 125 may execute applications for one example media player 135 and one example media meter 130 (e.g., each of the plurality of virtual machine(s) 125 include an application for one of the example media player(s) 135 and an application for one of the example media meter(s) 130). In some examples, the virtual machine(s) 125 may execute applications for a selection of the example media players 135 and a selection of the example media meters 130. For example, a group of virtual machines 125 may execute applications for a selection of the example media players 135 and the example media meters 130 (e.g., the group of virtual machines 125 may share access to the selection of the example media players 135 and the example media meters 130). In some examples, the virtual machine(s) may include any type of virtual machine such as, Windows® virtual machines, Linux® virtual machines, Amazon Elastic Compute Cloud (EC2), etc.

In the illustrated example of FIG. 1, for a given virtual machine 125, the example media player 135 implemented by that virtual machine 125 virtually presents (or play backs) a user-accessible and commercially available version of the media identified in the selected reference media asset(s) from the example asset validation tool 115. In some examples, the media player 135 receives the information of the user-accessible and commercially available version of the media from the asset validation tool. In some examples, the asset validation tool 115 determines the user-accessible and commercially available version of the media based on the identification information (e.g., the name of an episode of a TV show, the name of a song, etc.) and the media provider information (e.g., Netflix, Hulu, ABC, etc.) included in the collection of reference media assets that are associated with the selected reference media asset(s). The example media player 135 obtains the user-accessible and commercially available version of the media based on the information collected by the example asset validation tool 115. For example, if the asset validation tool 115 determines that a selected reference media asset includes information that identifies "Season 1, Episode 5" for the TV show "Criminal Minds" on Netflix, the example media player 135 obtains the user-accessible and commercially available version of the media from Netflix to virtually present (play back) episode 5 for season 1 of Criminal Minds. In some examples, a plurality of media player(s) 135 virtually present (play back) media of selected reference media assets in parallel on a plurality of the virtual machine(s) 125 to decrease the amount of time involved in playing the presentation of the selected reference media assets. In some examples, the media player(s) 135 may include a video player, an audio player, a streaming media player, etc. to virtually present (play back) different media (e.g., TV shows, movies, songs, etc.).

In the illustrated example of FIG. 1, for a given virtual machine 125, the example media meter 130 implemented by that virtual machine 125 collects media monitoring information from the presentation of media on the virtual machine 125 (e.g., via the media player 135 implemented by the virtual machine 125). For example, the media meter 130 executed by the virtual machine 125 monitors the media presented on the media player 135 executed by the virtual machine 125 and generates media monitoring data corresponding to the presentation of the media. In some examples, the media monitoring data can include monitored media signatures representative of the media monitored by the media meter 130. For example, the media meter 130 can determine a signature (e.g., generate signatures, extract signatures, etc.) associated with the presented media. Such signatures may be referred to as monitored media signatures or monitored signatures as they are determined from media monitored by the media meter 130. Example signature generation techniques that may be implemented by the media meter 130 include, but are not limited to, examples disclosed in U.S. Pat. No. 4,677,466 issued to Lert et al. on Jun. 30, 1987; U.S. Pat. No. 5,481,294 issued to Thomas et al. on Jan. 2, 1996; U.S. Pat. No. 7,460,684 issued to Srinivasan on Dec. 2, 2008; U.S. Pat. No. 9,438,940 issued to Nelson on Sep. 6, 2016; U.S. Pat. No. 9,548,830 issued to Kariyappa et al. on Jan. 17, 2017; U.S. Pat. No. 9,668,020 issued to Nelson et al. on May 30, 2017; U.S. Pat. No. 10,200,546 issued to Nelson et al. on Feb. 5, 2019; U.S. Publication No. 2005/0232411 to Srinivasan et al. published on Oct. 20, 2005; U.S. Publication No. 2006/0153296 to Deng published on Jul. 13, 2006; U.S. Publication No. 2006/0184961 to Lee et al. published on Aug. 17, 2006; U.S. Publication No. 2006/0195861 to Lee published on Aug. 31, 2006; U.S. Publication No. 2007/0274537 to Srinivasan published on Nov. 29, 2007; U.S. Publication No. 2008/0091288 to Srinivasan published on Apr. 17, 2008; and U.S. Publication No. 2008/0276265 to Topchy et al. published on Nov. 6, 2008. In some examples, the media monitoring data (e.g., the monitored media signatures) generated by the media meter 130 is used by the asset validation tool 115 to generate corresponding reference media resources from the playing the respective instances of the media on the virtual machine 125. In some examples, a plurality of media meter(s) 130 monitor the virtual presentation (play back) of the media of selected reference media assets in parallel on a plurality of the virtual machine(s) 125 to decrease the amount of time involved in monitoring the presentation of the selected reference media assets.

Figure 2:
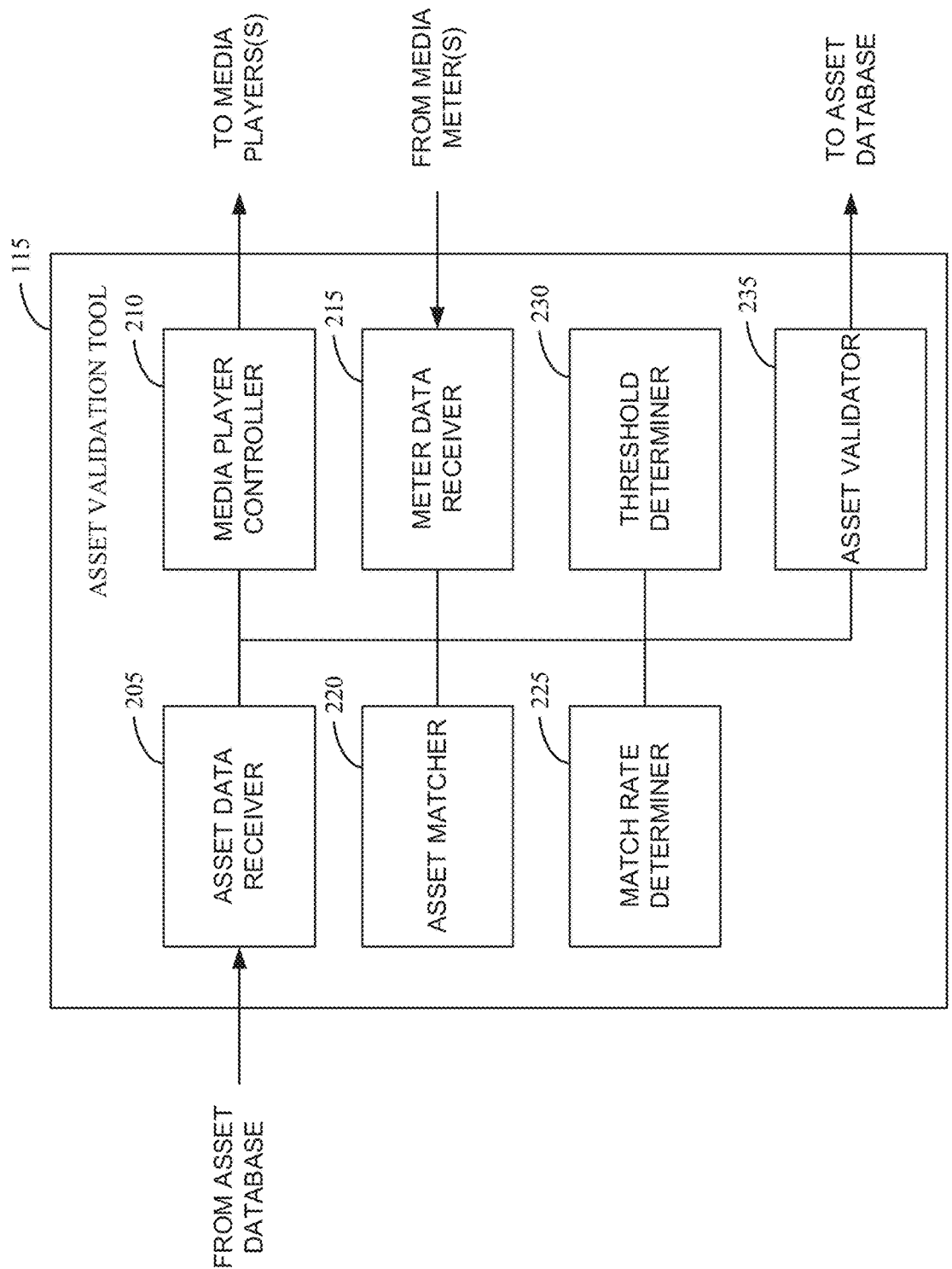
FIG. 2 is a block diagram of an example implementation of a asset validation tool included in the example environment of FIG. 1.

FIG. 2 is a block diagram of an example implementation of the example asset validation tool 115 included in the example environment 100 of FIG. 1. The example asset validation tool 115 of FIG. 2 includes an example asset data receiver 205, an example media player controller 210, an example meter data receiver 215, an example asset matcher 220, an example match rate determiner 225, an example threshold determiner 230, and an example asset validator 235.

The example asset data receiver 205 accesses a collection of reference media resources from the example asset database 120. In the illustrated example, the asset data receiver 205 identifies candidate media resources from the reference media resources associated with the reference media assets included in the example asset database 120. The example asset data receiver 205 selects reference media assets from the collection of reference media assets from the example asset database 120 and identifies candidate media resources as the reference media resources associated with the selected reference media assets. In some examples, the asset data receiver 205 selects each of the reference media assets from the collection of reference media assets from the example asset database 120 to be virtually presented and monitored on the launched virtual machine(s) 125. In some examples, the asset data receiver 205 may only select the new reference media assets added to the collection of reference media assets by the example media asset manager 110 of FIG. 1. In some examples, the asset data receiver 205 may select reference media assets from the collection of reference media assets that have not been validated recently by the asset validation tool 115. For example, the asset data receiver 205 may select reference media assets that do meet a threshold period of time since the last validation (e.g., one week since last validation, one month since last validation, one year since last validation, etc.). In some examples, the asset data receiver 205 also obtains the collection of identification information (e.g., the name of an episode of a TV show, the name of a song, etc.) and media provider information (e.g., Netflix, Hulu, etc.) associated with each of the reference media assets.

The example media player controller 210 determines the media associated with the identified candidate media resources from the example asset data receiver 205. The example media player controller 210 determines where a user-accessible and commercially available version of the media identified in the respective reference media assets associated with the candidate media resources the can be accessed and presented based on the identification information (e.g., the name of an episode of a TV show, the name of a song, etc.) and the media provider information (e.g., Netflix, Hulu, ABC, etc.) included in the collection of reference media assets from the asset database 120. For example, the media player controller 210 determines that the respective reference media asset for a candidate media resource includes information that identifies "Season 1, Episode 5" for the TV show "Criminal Minds" on Netflix. In such an example, the media player controller 210 provides the information for the user-accessible and commercially available version of the media to the example media player 135 for a given virtual machine 125 to obtain the user-accessible and commercially available version of the media from the provider's online service (Netflix's web service) to virtually present (play back) episode 5 for season 1 of Criminal Minds.

In the illustrated example, the media player controller 210 launches a given virtual machine 125 to execute an application to implement the example media player 135 to virtually present (or play back) the user-accessible and commercially available version of the media and to execute an application to implement the example media meter 130 to virtually monitor the resulting presentation of the user-accessible and commercially available version of the media. The example media player controller 210 interfaces the application to implement the example media player 135 and the application to implement the example media meter 130 on the virtual machine 125 to virtually present and monitor the media for the candidate media resources. In some examples, the media player controller 210 launches a plurality of virtual machine(s) 125 to correspond with the number of candidate media resources to test. In some examples, the example media player controller 210 can be an audio player controller, a video player controller, etc., tailored to control the example media player 135 implemented by the example virtual machine 125.

In the illustrated example of FIG. 2, the example meter data receiver 215 collects the media monitoring data from the example media meter(s) 130 of FIG. 1. In some examples, the meter data receiver 215 collects media monitoring signatures and/or media monitoring watermarks from the media meter(s) 130 based on the identified media played on the virtual machine(s) 125. For example, the example meter data receiver 215 collects media monitoring signatures and/or media monitoring watermarks from a given media meter 130 that were generated from the media meter 130 monitoring the media presented on the media player 135 (e.g., episode 5 for season 1 of Criminal Minds from Netflix).

The example asset matcher 220 generates test media resources from the media monitoring data collected by the example meter data receiver 215. In examples disclosed herein, a test media resource refers to the media monitoring watermarks and/or media monitoring signatures that are generated and/or obtained from the virtual presentation (play back) of the reference media asset (e.g., an episode of a television program, a song, a movie, etc.) associated with the candidate media resources on a given media player 135. In some examples, the asset matcher 220 generates test media resources from the media monitoring signatures. The example asset matcher 220 performs signature matching between the candidate media resources from the example asset data receiver 205 and the corresponding test media resources generated from the media monitoring data. In some examples, the asset matcher 220 compares the reference signatures associated with the candidate media resources from the example asset database 120 to the corresponding media monitoring signatures from the test media resources.

The example match rate determiner 225 calculates percent match rates between the candidate media resources and the corresponding test media resources. In some examples, the match rate determiner 225 calculates the percent match rates based on the comparison of the candidate media resources to the corresponding test media resources from the example asset matcher 220. In some examples, the match rate determiner 225 calculates the percent match rate for the comparison of the candidate media resources to the corresponding test media resources by calculating an amount of matches between the reference signatures of the candidate media resources and the media monitoring signatures of the test media resources. For example, the match rate determiner 225 may determine a total amount of matches, a percentage of matches, etc. between the reference signatures and the media monitoring signatures.

The example threshold determiner 230 determines if the percent match rates determined by the match rate determiner 225 satisfies threshold(s) for validating the candidate media resources. In some examples, the threshold determiner 230 determines a first threshold to determine whether the candidate media resources should be removed from the asset database 120 of FIG. 1. In some examples, the first threshold determines which candidate media resources should not be validated. In some examples, the first threshold may be an amount of signature matches between the candidate media resources and the test media resources (e.g., 70 total signature matches), a percentage of signature matches between the candidate media resources and the test media resources (e.g., 60%, 70%, etc.), etc. In some examples, the example threshold determiner 230 determines a second threshold to determine whether the candidate media resources is validated or should be corrected based on the corresponding test media resource. In some examples, the second threshold is greater than the first threshold (e.g., a higher percentage, a larger number of total signature matches). In some examples, the second threshold may be an amount of signature matches between the candidate media resources and the test media resources (e.g., 85 total signature matches), a percentage of signature matches between the candidate media resources and the test media resources (e.g., 90%, 95%, etc.), etc.

In the illustrated example of FIG. 2, the example asset validator 235 generates a collection of validated media resources to save as reference media resources in the example asset database 120 of FIG. 1. In some examples, if the percent match rate between a candidate media resource and a corresponding test media resource does not satisfy the first threshold (e.g., is below), then the example asset validator 235 determines the candidate media resource does not represent the associated media and is removed from the collection of reference media resources in the example asset database 120. In some examples, if the percent match rate between a candidate media resource and a corresponding test media resource does not satisfy the second threshold (e.g., is below), then the example asset validator 235 determines the candidate media resource does not completely represent the associated media (e.g., the candidate media resource may include inaccurate reference signatures that were not included in the test media resources from playing the associated media), and the asset validator 235 corrects the candidate media resource based on the corresponding test media resource before being saved as a reference media resource in the example asset database 120. In some examples, if the percent match rate between a candidate media resource and a corresponding test media resource does satisfy the second threshold (e.g., meets or exceeds), then the asset validator 235 validates the candidate media resource and saves the candidate media resource as a reference media resource in the example asset database 120. The example asset validator 235 outputs a validated collection of reference media resources associated with the reference media assets based on a result of the comparisons between the candidate media resources and the corresponding test media resources.

While an example manner of implementing the asset validation tool 115 of FIG. 1 is illustrated in FIG. 2, one or more of the elements, processes and/or devices illustrated in FIG. 2 may be combined, divided, re-arranged, omitted, eliminated and/or implemented in any other way. Further, the example asset data receiver 205, the example media player controller 210, the meter data receiver 215, the example asset matcher 220, the example match rate determiner 225, threshold determiner 230, the example asset validator 235 and/or, more generally, the example asset validation tool 115 of FIG. 2 may be implemented by hardware, software, firmware and/or any combination of hardware, software and/or firmware. Thus, for example, any of the example asset data receiver 205, the example media player controller 210, the meter data receiver 215, the example asset matcher 220, the example match rate determiner 225, threshold determiner 230, the example asset validator 235 and/or, more generally, the example asset validation tool 115 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example asset data receiver 205, the example media player controller 210, the meter data receiver 215, the example asset matcher 220, the example match rate determiner 225, threshold determiner 230, and/or the example asset validator 235 is/are hereby expressly defined to include a non-transitory computer readable storage device or storage disk such as a memory, a digital versatile disk (DVD), a compact disk (CD), a Blu-ray disk, etc. including the software and/or firmware. Further still, the example asset validation tool 115 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
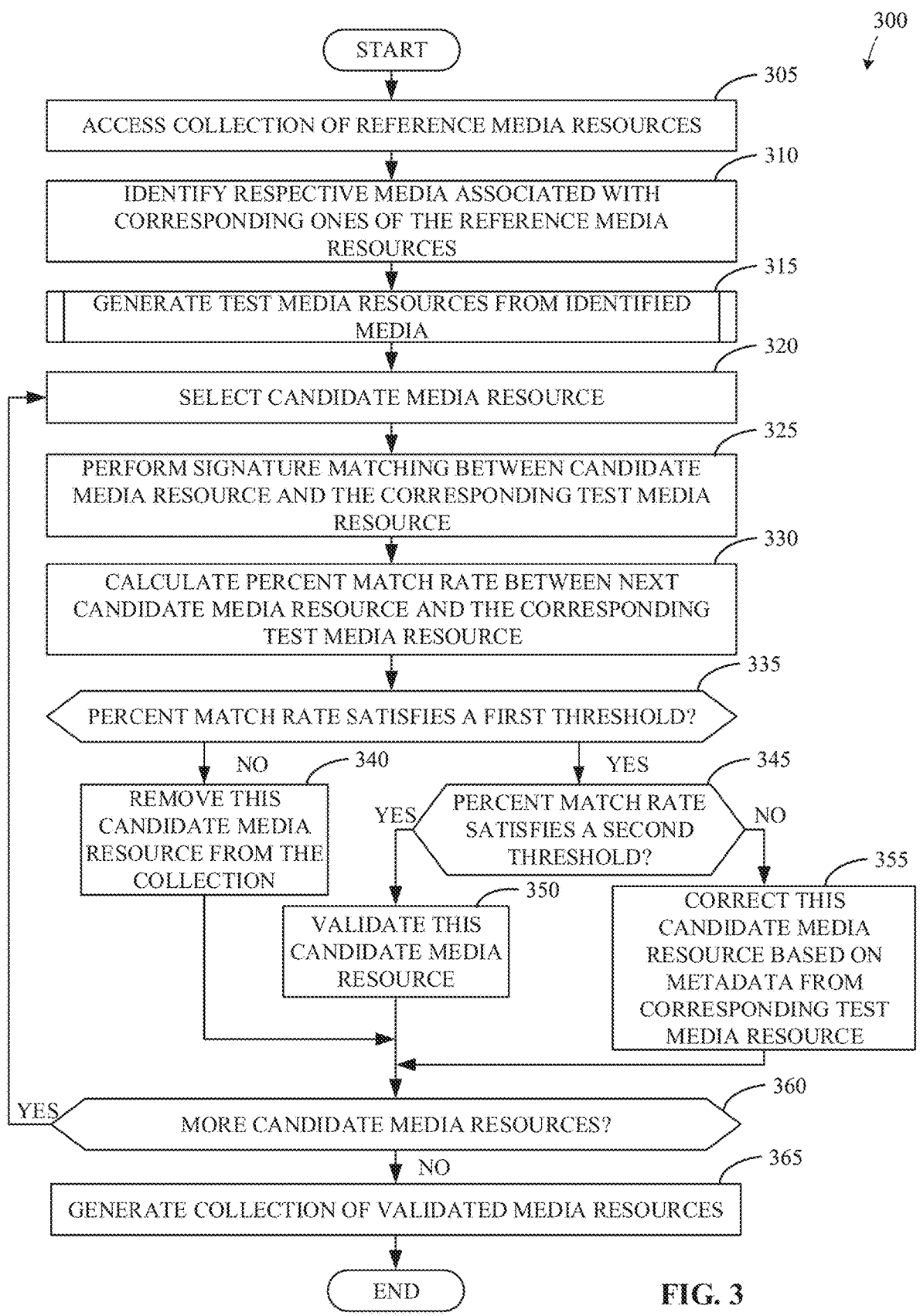
FIG. 3 is a flowchart representative of machine readable instructions which may be executed to implement the asset validation tool of FIG. 2.
Figure 4:
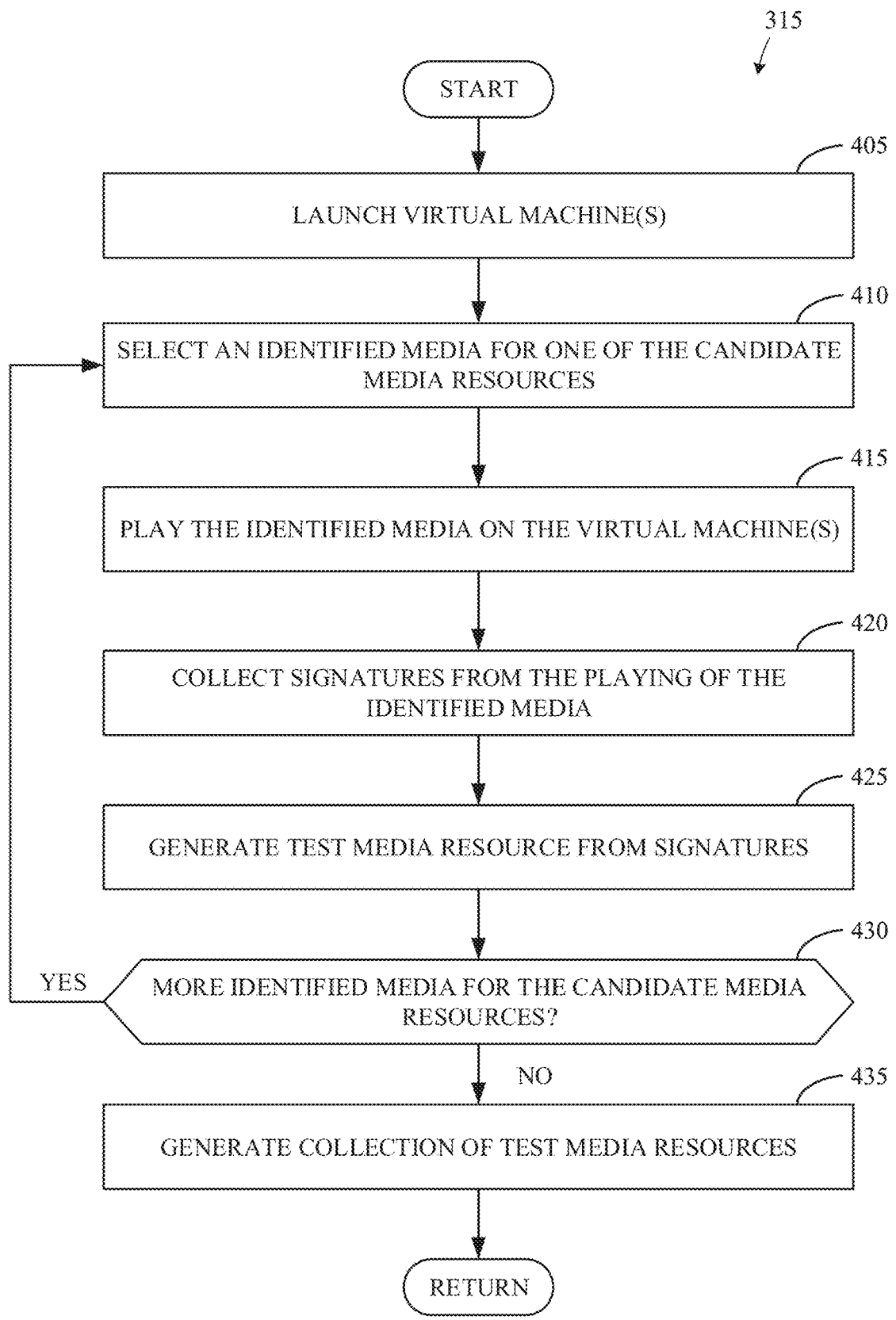
FIG. 4 is a flowchart representative of machine readable instructions which may be executed to implement an example media player controller, an example meter data receiver, and an example asset matcher included in the asset validation tool of FIG. 2.

Flowcharts representative of example hardware logic, machine readable instructions, hardware implemented state machines, and/or any combination thereof for implementing the asset validation tool of FIG. 2 are shown in FIGS. 3 and 4. The machine readable instructions may be one or more executable programs or portion(s) of an executable program for execution by a computer processor and/or processor circuitry, such as the processor 512 shown in the example processor platform 500 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example asset validation tool of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.)

before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3 and 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 is a flowchart representative of machine readable instructions which may be executed to implement the asset validation tool 115 of FIG. 2. The program 300 of FIG. 3 begins execution at block 305 at which the example asset data receiver 205 accesses a collection of reference media resources. In some examples, the example asset data receiver 205 accesses a collection of reference media resources from the example asset database 120 of FIG. 1. In the illustrated example, the asset data receiver 205 identifies candidate media resources from the reference media resources included in the example asset database 120. The example asset data receiver 205 selects reference media assets from the collection of reference media assets from the example asset database 120 and identifies candidate media resources as the reference media resources associated with the selected reference media assets. In some examples, the asset data receiver 205 selects each of the reference media assets from the collection of reference media assets from the example asset database 120 to be virtually presented and monitored on the launched virtual machine(s) 125. In some examples, the asset data receiver 205 may only select the new reference media assets added to the collection of reference media assets by the example media asset manager 110 of FIG. 1. In some examples, the asset data receiver 205 may select reference media assets from the collection of reference media assets that have not been validated recently by the asset validation tool 115. For example, the asset data receiver 205 may select reference media assets that do meet a threshold period of time since the last validation (e.g., one week since last validation, one month since last validation, one year since last validation, etc.). In some examples, the asset data receiver 205 also obtains the collection of identification information (e.g., the name of an episode of a TV show, the name of a song, etc.) and media provider information (e.g., Netflix, Hulu, etc.) associated with each of the reference media assets.

At block 310, the example media player controller 210 identifies respective media associated with the corresponding ones of the reference media resources. The example media player controller 210 determines where a user-accessible and commercially available version of the media identified in the respective reference media assets associated with the candidate media resources the can be accessed and presented based on the identification information (e.g., the name of an episode of a TV show, the name of a song, etc.) and the media provider information (e.g., Netflix, Hulu, ABC, etc.) included in the collection of reference media assets from the asset database 120. For example, the media player controller 210 determines that the respective reference media asset for a candidate media resource includes information that identifies "Season 1, Episode 5" for the TV show "Criminal Minds" on Netflix.

At block 315, the example media player controller 210 generates test media resources from the identified media. The example media player controller 210 generates test media resources from the media associated with the identified candidate media resources from the example asset data receiver 205. In examples disclosed herein, a test media resource refers to the media monitoring watermarks and/or media monitoring signatures that are generated and/or obtained from the virtual presentation (play back) of the reference media asset (e.g., an episode of a television program, a song, a movie, etc.) associated with the candidate media resources on a given media player 135. As described in further detail below, the example flowchart 315 of FIG. 4 represents example instructions that may be implemented to generate test media resources from the identified media.

At block 320, the example match rate determiner 225 selects a candidate media resource. At block 325, the example asset matcher 220 performs signature matching between the candidate media resource and the corresponding test media resource. The example asset matcher 220 performs signature matching between the candidate media resources from the example asset data receiver 205 and the corresponding test media resources generates from the media monitoring data. In some examples, the asset matcher 220 compares the reference signatures associated with the candidate media resources from the example asset database 120 to the corresponding media monitoring signatures from the test media resources.

At block 330, the example match rate determiner 225 calculates the percent match rate between the next candidate reference media resource and the corresponding test media resource. In some examples, the match rate determiner 225 calculates percent match rates between the candidate media resources and the corresponding test media resources. In some examples, the match rate determiner 225 calculates the percent match rates based on the comparison of the candidate media resources to the corresponding test media resources from the example asset matcher 220. In some examples, the match rate determiner 225 calculates the percent match rate for the comparison of the candidate media resources to the corresponding test media resources by calculating an amount of matches between the reference signatures of the candidate media resources and the media monitoring signatures of the test media resources. For example, the match rate determiner 225 may determine a total amount of matches, a percentage of matches, etc. between the reference signatures and the media monitoring signatures.

At block 335, the example threshold determiner 230 determines if the percent match rate satisfies a first threshold. In some examples, the threshold determiner 230 determines a first threshold to determine whether the candidate media resources should be removed from the asset database 120 of FIG. 1. In some examples, the first threshold determines which candidate media resources should not be validated. In some examples, the first threshold may be an amount of signature matches between the candidate media resources and the test media resources (e.g., 70 total signature matches), a percentage of signature matches between the candidate media resources and the test media resources (e.g., 60%, 70%, etc.), etc. If the example threshold determiner 230 determines the percent match rate does not satisfy the first threshold, then process 300 continues to block 340 at which the example asset validator 235 removes this candidate media resource from the collection. In some examples, if the percent match rate between a candidate media resource and a corresponding test media resource does not satisfy the first threshold (e.g., is below), then the example asset validator 235 determines the candidate media resource does not represent the associated media and is removed from the collection of reference media resources in the example asset database 120.

If the example threshold determiner 230 determines the percent match rate satisfies the first threshold, then process 300 continues to block 345 at which the example threshold determiner 230 determines if the percent match rate satisfies a second threshold. In some examples, the example threshold determiner 230 determines a second threshold to determine whether the candidate media resources is validated or should be corrected based on the corresponding test media resource. In some examples, the second threshold may be an amount of signature matches between the candidate media resources and the test media resources (e.g., 85 total signature matches), a percentage of signature matches between the candidate media resources and the test media resources (e.g., 90%, 95%, etc.), etc. If the example threshold determiner 230 determines the percent match rate satisfies the second threshold, then process 300 continues to block 350 at which the example asset validator 235 validates this candidate media resource. In some examples, if the percent match rate between a candidate media resource and a corresponding test media resource does satisfy the second threshold (e.g., meets or exceeds), then the asset validator 235 validates the candidate media resource and saves the candidate media resource as a reference media resource in the example asset database 120.

If the example threshold determiner 230 determines the percent match rate does not satisfy the second threshold (but satisfies the first threshold), then process 300 continues to block 355 at which the example asset validator 235 corrects this candidate media resource based on the corresponding test media resource. In some examples, if the percent match rate between a candidate media resource and a corresponding test media resource does not satisfy the second threshold (e.g., is below), then the example asset validator 235 determines the candidate media resource does not completely represent the associated media (e.g., the candidate media resource may include inaccurate reference signatures that were not included in the test media resources from playing the associated media), and the asset validator 235 corrects the candidate media resource based on the corresponding test media resource before being saved as a reference media resource in the example asset database 120.

At block 360, the example match rate determiner 225 determines if there are more candidate media resources. If the example match rate determiner 225 determines there are more candidate media resources, then process 300 returns to block 320 at which the example match rate determiner 225 selects a new candidate media resource. If the example match rate determiner 225 determines there are no more candidate media resources, then process 300 continues to block 365 at which the example asset validator 235 generates a collection of validated media resources. In some examples, the asset validator 235 generates a collection of validated media resources to save as reference media assets in the example asset database 120 of FIG. 1. The example asset validator 235 outputs a validated collection of reference media resources associated with the reference media assets based on a result of the comparisons between the candidate media resources and the corresponding test media resources. After block 365 completes, process 300 ends.

FIG. 4 is a flowchart representative of machine readable instructions which may be executed to implement the implement the example media player controller 210, the example meter data receiver 215, and the example asset matcher 220 included in the asset validation tool 115 of FIG. 2. The program 315 of FIG. 4 begins execution at block 405 at which the example media player controller 210 launches the virtual machine(s). In some examples, the media player controller 210 launches a given virtual machine 125 to execute an application to implement the example media player 135 to virtually present (or play back) the user-accessible and commercially available version of the media and to execute an application to implement the example media meter 130 to virtually monitor the resulting presentation of the user-accessible and commercially available version of the media. The example media player controller 210 interfaces the application to implement the example media player 135 and the application to implement the example media meter 130 on the virtual machine 125 to virtually present and monitor the media for the candidate media resources. In some examples, the media player controller 210 launches a plurality of virtual machine(s) 125 to correspond with the number of candidate media resources to test.

At block 410, the example media player controller 210 selects an identified media for one of the candidate media resources. The example media player controller 210 determines the media associated with the identified candidate media resources from the example asset data receiver 205. The example media player controller 210 determines where a user-accessible and commercially available version of the media identified in the respective reference media assets associated with the candidate media resources the can be accessed and presented based on the identification information (e.g., the name of an episode of a TV show, the name of a song, etc.) and the media provider information (e.g., Netflix, Hulu, ABC, etc.) included in the collection of reference media assets from the asset database 120.

At block 415, the example media player controller 210 plays the identified media on the virtual machine(s). In some examples, interfaces the application to implement the example media player 135 to virtually present (or play back) the user-accessible and commercially available version of the media. At block 420, the example meter data receiver 215 collects signatures from the playing of the identified media. In some examples, the meter data receiver 215 collects media monitoring signatures from the media meter 130 based on the identified media virtually presented (played back) on the media player 135. At block 425, the example asset matcher 220 generates a test media resource from the signatures. In some examples, the asset matcher 220 generates test media resources from the media monitoring data collected by the example meter data receiver 215. In some examples, the asset matcher 220 generates test media resources from the media monitoring signatures.

At block 430, the example media player controller 210 determines if there are more identified media from the candidate media resources. If the example media player controller 210 determines there are more identified media from the candidate media resources, then process 315 returns to block 410 at which the example media player controller 210 selects an identified media for one of the candidate media resources. If the example media player controller 210 determines there are no more identified media from the candidate media resources, then process 315 continues to block 425 at which the example asset matcher 220 generates a collection of test media resources. After block 435 completes, process 315 completes and returns to process 300 of FIG. 3.

Figure 5:
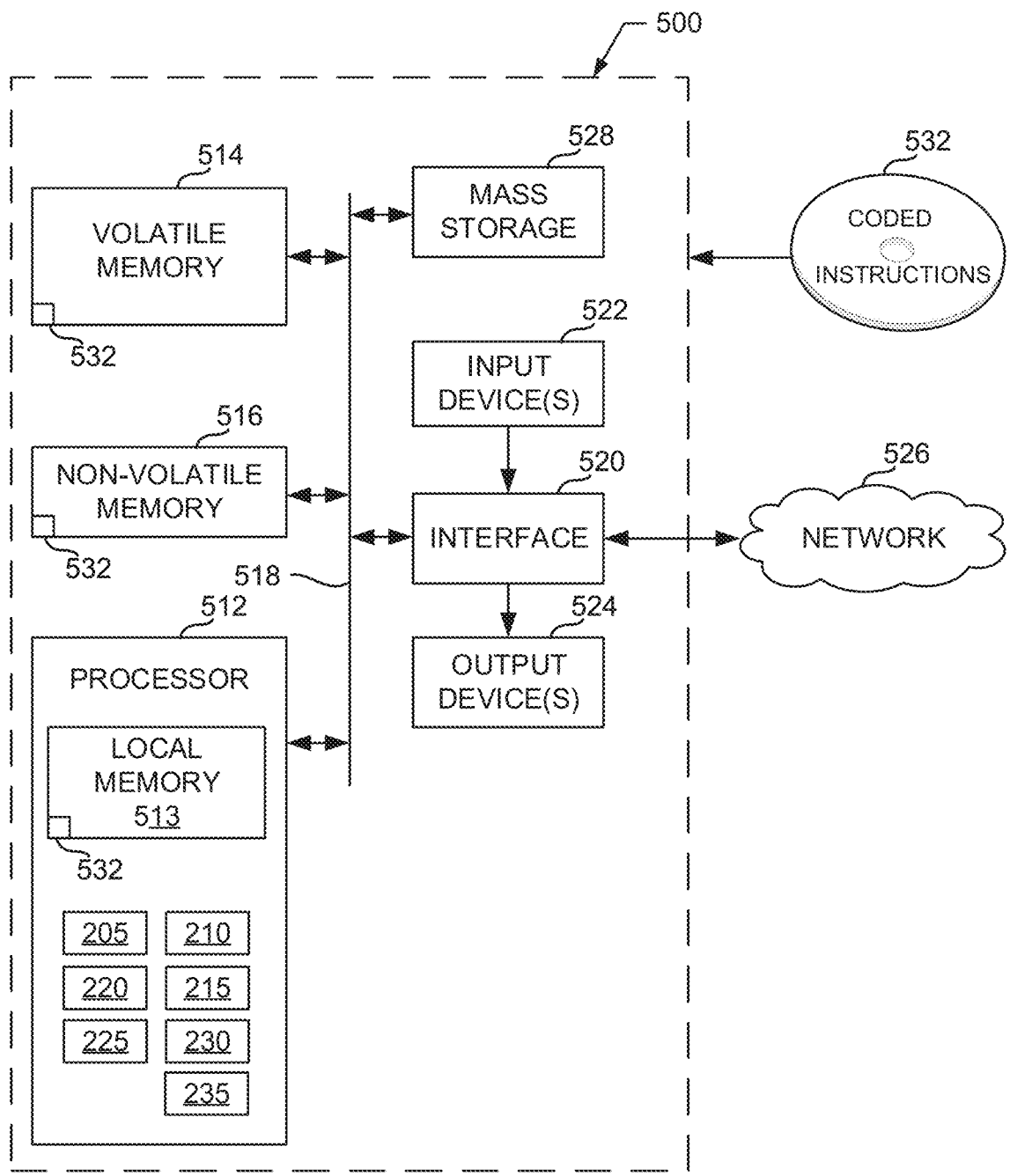
FIG. 5 is a block diagram of an example processing platform structured to execute the instructions of FIGS. 3 and 4 to implement the asset validation tool of FIGS. 1 and/or 2.

FIG. 5 is a block diagram of an example processor platform 500 structured to execute the instructions of FIGS. 3 and 4 to implement the asset validation tool 115 of FIG. 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example asset data receiver 205, the example media player controller 210, the example asset matcher 220, the example meter data receiver 215, the example match rate determiner 225, the example threshold determiner 230, and the example asset validator 235.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 532 of FIGS. 3 and 4 may be stored in the mass storage device 528, in the volatile memory 514, in the non-volatile memory 516, and/or on a removable non-transitory computer readable storage medium such as a CD or DVD.

From the foregoing, it will be appreciated that example methods, apparatus and articles of manufacture have been disclosed that allow for the validation of reference media assets in media identification systems. The disclosed examples improve media asset creation by checking the reference signatures of the media assets against signatures generated from media monitoring data obtained from the playing of a user-accessible version media asset to verify the reference signatures will match the media asset during an actual exposure to the media asset. The disclosed examples use virtual machine(s) to efficiently generate signatures from monitoring the playing of the media assets in order to test against the reference signatures of the media assets. The disclosed examples allow for more accurate crediting of media through validating the reference media assets to ensure that the reference media assets are accurate for matching with the real world playing of the media asset.

Example methods, apparatus, systems, and articles of manufacture to validate reference media assets in media identification systems are disclosed herein. Further examples and combinations thereof include the following:

Example 1 includes an apparatus comprising an asset data receiver to identify respective instances of media represented by corresponding candidate media resources to be verified, a media player controller to cause the respective instances of media to be presented and monitored by corresponding ones of a plurality of virtual machines, the virtual machines to access the instances of media from at least one service provider, an asset matcher to perform a comparison of a first one of the candidate media resources to a corresponding test media resource generated by a first one of the virtual machines that played and monitored a first one of the instances of media represented by the first one of the candidate media resources, and an asset validator to validate the first one of the candidate media resources based on the comparison.

Example 2 includes the apparatus of example 1, wherein the plurality of virtual machines implement respective media meters to generate signatures from presentations of the respective instances of the media, each virtual machine is to implement a respective media player to present the respective instances of the media, and the asset matcher is to generate corresponding test media resources based on the generated signatures.

Example 3 includes the apparatus of example 1, wherein the asset matcher is to compare a first plurality of signatures included in the first one of the candidate media resources to a second plurality of signatures included in the corresponding test media resource.

Example 4 includes the apparatus of example 3, further including a match rate determiner to calculate a percent match rate based on the comparison of the first one of the candidate media resources to the corresponding test media resource.

Example 5 includes the apparatus of example 4, wherein the match rate determiner is to calculate the percent match rate for the comparison of the first one of the candidate media resources to the corresponding test media resource based on an amount of matches between the first plurality of signatures and the second plurality of signatures.

Example 6 includes the apparatus of example 4, further including a threshold determiner to determine whether the percent match rate satisfies a threshold.

Example 7 includes the apparatus of example 6, wherein the asset validator is to determine the first one of the candidate media resources is valid when the percent match rate satisfies the threshold.

Example 8 includes the apparatus of example 6, wherein the threshold is a first threshold, and the threshold determiner is to determine whether the percent match rate satisfies a second threshold.

Example 9 includes the apparatus of example 8, wherein the asset validator is to determine the first one of the candidate media resources is at least one of valid or to be corrected based on whether the percent match rate satisfies the second threshold.

Example 10 includes At least one non-transitory computer readable medium comprising instructions which, when executed, cause one or more processors to at least identify respective instances of media represented by corresponding candidate media resources to be verified, cause the respective instances of media to be presented and monitored by corresponding ones of a plurality of virtual machines, the virtual machines to access the instances of media from at least one service provider, perform a comparison of a first one of the candidate media resources to a corresponding test media resource generated by a first one of the virtual machines that played and monitored a first one of the instances of media represented by the first one of the candidate media resources, and validate the first one of the candidate media resources based on the comparison.

Example 11 includes the at least one non-transitory computer readable medium of example 10, wherein the plurality of virtual machines implement respective media meters to generate signatures from presentations of the respective instances of the media, each virtual machine is to implement a respective media player to present the respective instances of the media, and the instructions cause the one or more processors to generate corresponding test media resources based on the generated signatures.

Example 12 includes the at least one non-transitory computer readable medium of example 10, wherein the instructions cause the one or more processors to compare a first plurality of signatures included in the first one of the candidate media resources to a second plurality of signatures included in the corresponding test media resource.

Example 13 includes the at least one non-transitory computer readable medium of example 12, wherein the instructions cause the one or more processors to calculate a percent match rate based on the comparison of the first one of the candidate media resources to the corresponding test media resource.

Example 14 includes the at least one non-transitory computer readable medium of example 13, wherein the instructions cause the one or more processors to calculate the percent match rate for the comparison of the first one of the candidate media resources to the corresponding test media resource based on an amount of matches between the first plurality of signatures and the second plurality of signatures.

Example 15 includes the at least one non-transitory computer readable medium of example 13, wherein the instructions cause the one or more processors to determine whether the percent match rate satisfies a threshold.

Example 16 includes the at least one non-transitory computer readable medium of example 15, wherein the instructions cause the one or more processors to determine the first one of the candidate media resources is valid when the percent match rate satisfies the threshold.

Example 17 includes the at least one non-transitory computer readable medium of example 15, wherein the threshold is a first threshold, and the instructions cause the one or more processors to determine whether the percent match rate satisfies a second threshold.

Example 18 includes the at least one non-transitory computer readable medium of example 17, wherein the instructions cause the one or more processors to determine the first one of the candidate media resources is at least one of valid or to be corrected based on whether the percent match rate satisfies the second threshold.

Example 19 includes a method comprising identifying respective instances of media represented by corresponding candidate media resources to be verified, causing the respective instances of media to be presented and monitored by corresponding ones of a plurality of virtual machines, the virtual machines to access the instances of media from at least one service provider, performing, by executing an instruction with at least one processor, a comparison of a first one of the candidate media resources to a corresponding test media resource generated by a first one of the virtual machines that played and monitored a first one of the instances of media represented by the first one of the candidate media resources, and validating the first one of the candidate media resources based on the comparison.

Example 20 includes the method of example 19, wherein the plurality of virtual machines implement respective media meters to generate signatures from presentation of the respective instances of the media, each virtual machine implements a respective media player to present the respective instances of the media, and further including generating corresponding test media resources based on the generated signatures.

Example 21 includes the method of example 19, further including comparing a first plurality of signatures included in the first one of the candidate media resources to a second plurality of signatures included in the corresponding test media resource.

Example 22 includes the method of example 21, further including calculating a percent match rate based on the comparison of the first one of the candidate media resources to the corresponding test media resource.

Example 23 includes the method of example 22, further including calculating the percent match rate for the comparison of the first one of the candidate media resources to the corresponding test media resource based on an amount of matches between the first plurality of signatures and the second plurality of signatures.

Example 24 includes the method of example 22, further including determining whether the percent match rate satisfies a threshold.

Example 25 includes the method of example 24, further including determining the first one of the candidate media resources is valid when the percent match rate satisfies the threshold.

Example 26 includes the method of example 24, wherein the threshold is a first threshold, and further including determining whether the percent match rate satisfies a second threshold.

Example 27 includes the method of example 26, further including determining the first one of the candidate media resources is at least one of valid or to be corrected based on whether the percent match rate satisfies the second threshold.

Example 28 includes an apparatus comprising memory, and processor circuitry to execute computer readable instructions to at least identify respective instances of media represented by corresponding candidate media resources to be verified, cause the respective instances of media to be presented and monitored by corresponding ones of a plurality of virtual machines, the virtual machines to access the instances of media from at least one service provider, perform a comparison of a first one of the candidate media resources to a corresponding test media resource generated by a first one of the virtual machines that played and monitored a first one of the instances of media represented by the first one of the candidate media resources, and validate the first one of the candidate media resources based on the comparison.

Example 29 includes the apparatus of example 28, wherein the plurality of virtual machines implement respective media meters to generate signatures from presentations of the respective instances of the media, each virtual machine is to implement a respective media player to present the respective instances of the media, and the processor circuitry is to generate corresponding test media resources based on the generated signatures.

Example 30 includes the apparatus of example 28, wherein the processor circuitry is to compare a first plurality of signatures included in the first one of the candidate media resources to a second plurality of signatures included in the corresponding test media resource.

Example 31 includes the apparatus of example 30, wherein the processor circuitry is to calculate a percent match rate based on the comparison of the first one of the candidate media resources to the corresponding test media resource.

Example 32 includes the apparatus of example 31, wherein the processor circuitry is to calculate the percent match rate for the comparison of the first one of the candidate media resources to the corresponding test media resource based on an amount of matches between the first plurality of signatures and the second plurality of signatures.

Example 33 includes the apparatus of example 31, wherein the processor circuitry is to determine whether the percent match rate satisfies a threshold.

Example 34 includes the apparatus of example 33, wherein the processor circuitry is to determine the first one of the candidate media resources is valid when the percent match rate satisfies the threshold.

Example 35 includes the apparatus of example 33, wherein the threshold is a first threshold, and the processor circuitry is to determine whether the percent match rate satisfies a second threshold.

Example 36 includes the apparatus of example 35, wherein the processor circuitry is to determine the first one of the candidate media resources is at least one of valid or to be corrected based on whether the percent match rate satisfies the second threshold.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   an asset data receiver to identify respective instances of media represented by corresponding candidate media signatures to be verified;
   a media player controller to cause the respective instances of media to be presented and monitored by corresponding ones of a plurality of virtual machines in parallel, the virtual machines to access the instances of media from at least one service provider;
   an asset matcher to:
      generate respective test media signatures based on the respective instances of media presented and monitored by the corresponding ones of the plurality of virtual machines; and
      perform a comparison of a first one of the candidate media signatures to a first one of the test media signatures generated based on a first one of the instances of media represented by the first one of the candidate media signatures; and
   an asset validator to:
      validate the first one of the candidate media signatures in response to a result of the comparison satisfying a first threshold;
      correct the first one of the candidate media signatures in response to the result of the comparison not satisfying the first threshold but satisfying a second threshold, the second threshold lower than the first threshold; and
      remove the first one of the candidate media signatures from a database in response to the result of the comparison not satisfying the second threshold.

2. The apparatus of claim 1, wherein the plurality of virtual machines implement respective media meters to generate signatures from presentations of the respective instances of the media, each virtual machine is to implement a respective media player to present the respective instances of the media, and the asset matcher is to generate corresponding test media signatures based on the generated signatures.

3. The apparatus of claim 1, wherein the asset matcher is to compare a first plurality of signatures included in the first one of the candidate media signatures to a second plurality of signatures included in the first one of the test media signatures.

4. The apparatus of claim 3, further including a match rate determiner to calculate a percent match rate as the result of the comparison of the first one of the candidate media signatures to the first one of the test media signatures.

5. The apparatus of claim 4, wherein the match rate determiner is to calculate the percent match rate based on an amount of matches between the first plurality of signatures and the second plurality of signatures.

6. The apparatus of claim 4, further including a threshold determiner to determine whether the percent match rate satisfies the first threshold.

7. The apparatus of claim 6, wherein the asset validator is to determine the first one of the candidate media signatures is valid when the percent match rate satisfies the first threshold.

8. The apparatus of claim 6, wherein the threshold determiner is to determine whether the percent match rate satisfies the second threshold.

9. At least one non-transitory computer readable medium comprising instructions which, when executed, cause one or more processors to at least:
   identify respective instances of media represented by corresponding candidate media signatures to be verified;
   cause the respective instances of media to be presented and monitored by corresponding ones of a plurality of virtual machines in parallel, the virtual machines to access the instances of media from at least one service provider;
   generate respective test media signatures based on the respective instances of media presented and monitored by the corresponding ones of the plurality of virtual machines;
   perform a comparison of a first one of the candidate media signatures to a first one of the test media signatures generated based on a first one of the instances of media represented by the first one of the candidate media signatures;
   validate the first one of the candidate media signatures in response to a result of the comparison satisfying a first threshold;
   correct the first one of the candidate media signatures in response to the result of the comparison not satisfying the first threshold but satisfying a second threshold, the second threshold lower than the first threshold; and
   remove the first one of the candidate media signatures from a database in response to the result of the comparison not satisfying the second threshold.

10. The at least one non-transitory computer readable medium of claim 9, wherein the plurality of virtual machines implement respective media meters to generate signatures from presentations of the respective instances of the media, each virtual machine is to implement a respective media player to present the respective instances of the media, and the instructions cause the one or more processors to generate corresponding test media signatures based on the generated signatures.

11. An apparatus comprising:
    memory; and
    processor circuitry to execute computer readable instructions to at least:
       identify respective instances of media represented by corresponding candidate media signatures to be verified;
       cause the respective instances of media to be presented and monitored by corresponding ones of a plurality of virtual machines in parallel, the virtual machines to access the instances of media from at least one service provider;
       generate respective test media signatures based on the respective instances of media presented and monitored by the corresponding ones of the plurality of virtual machines;
       perform a comparison of a first one of the candidate media signatures to a first one of the test media signatures generated based on a first one of the instances of media represented by the first one of the candidate media signatures; and
       validate the first one of the candidate media signatures in response to a result the comparison satisfying a first threshold;

correct the first one of the candidate media signatures in response to the result of the comparison not satisfying the first threshold but satisfying a second threshold, the second threshold lower than the first threshold; and remove the first one of the candidate media signatures from a database in response to the result of the comparison not satisfying the second threshold.

12. The apparatus of claim 11, wherein the plurality of virtual machines implement respective media meters to generate signatures from presentations of the respective instances of the media, each virtual machine is to implement a respective media player to present the respective instances of the media, and the processor circuitry is to generate corresponding test media signatures based on the generated signatures.

13. The apparatus of claim 11, wherein the processor circuitry is to compare a first plurality of signatures included in the first one of the candidate media signatures to a second plurality of signatures included in the first one of the test media signatures.

14. The apparatus of claim 13, wherein the processor circuitry is to calculate a percent match rate as the result of the comparison of the first one of the candidate media signatures to the first one of the test media signatures.

15. The apparatus of claim 14, wherein the processor circuitry is to calculate the percent match rate based on an amount of matches between the first plurality of signatures and the second plurality of signatures.

16. The apparatus of claim 14, wherein the processor circuitry is to determine whether the percent match rate satisfies the first threshold.

17. The apparatus of claim 16, wherein the processor circuitry is to determine the first one of the candidate media signatures is valid when the percent match rate satisfies the first threshold.

18. The apparatus of claim 16, wherein the processor circuitry is to determine whether the percent match rate satisfies the second threshold.

* * * * *